Dec. 29, 1964  S. B. ELLIOTT  3,163,078
APPARATUS FOR VISUAL INTERPRETATIONS OF ELECTRICAL CURRENTS
Filed Oct. 3, 1963  4 Sheets-Sheet 1
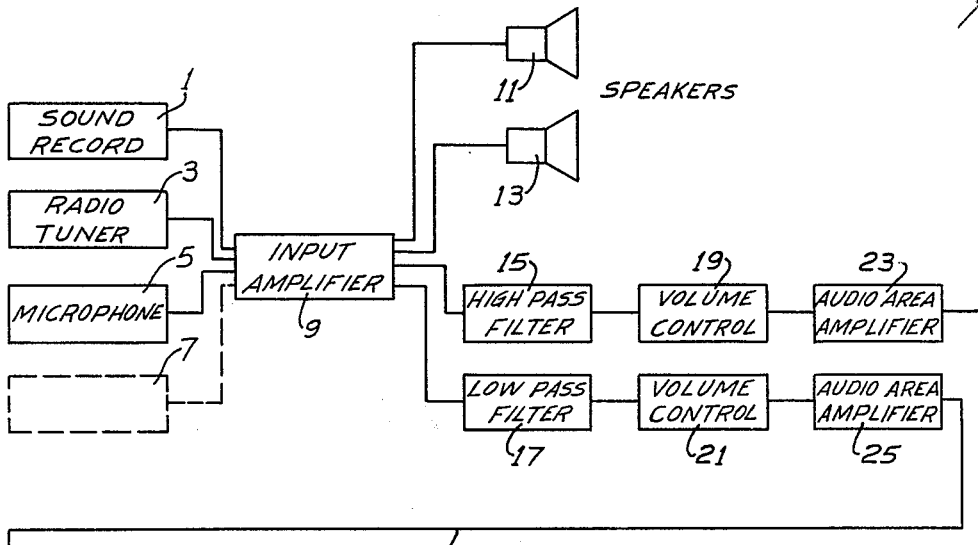
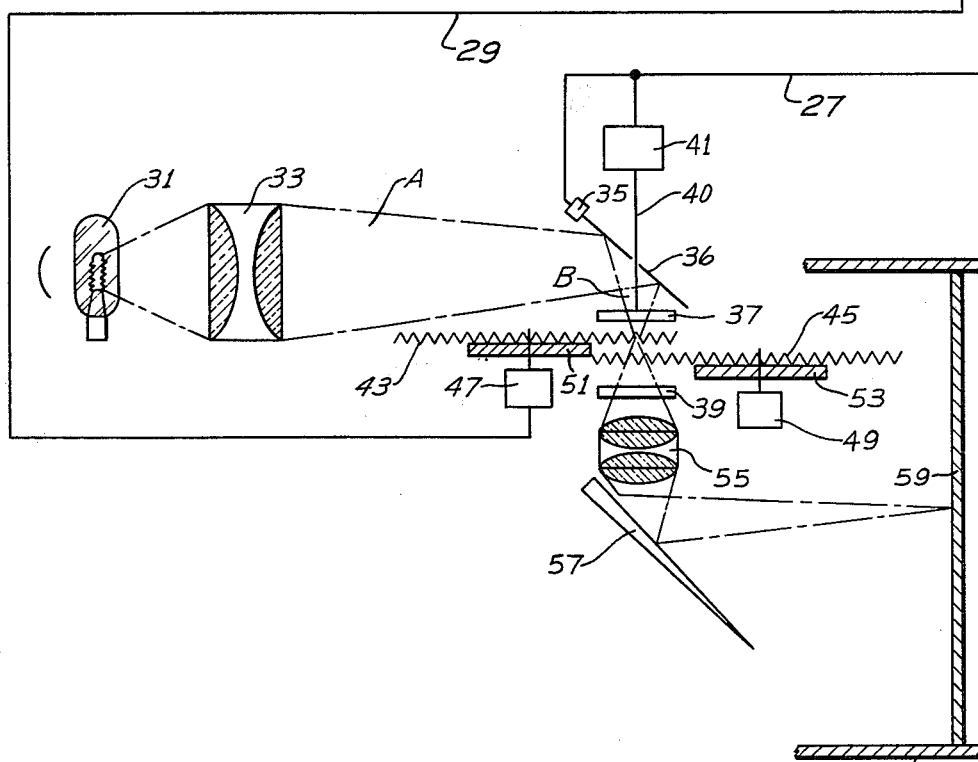
Fig. 1.
INVENTOR.
STANLEY B. ELLIOTT
BY
Meyer, Baldwin, Doran & Egan
ATTORNEYS.

Dec. 29, 1964 S. B. ELLIOTT 3,163,078
APPARATUS FOR VISUAL INTERPRETATIONS OF ELECTRICAL CURRENTS
Filed Oct. 3, 1963 4 Sheets-Sheet 2

INVENTOR.
STANLEY B. ELLIOTT
BY
Meyer, Baldwin, Doran & Egan
ATTORNEYS.

Dec. 29, 1964    S. B. ELLIOTT    3,163,078
APPARATUS FOR VISUAL INTERPRETATIONS OF ELECTRICAL CURRENTS
Filed Oct. 3, 1963    4 Sheets-Sheet 3
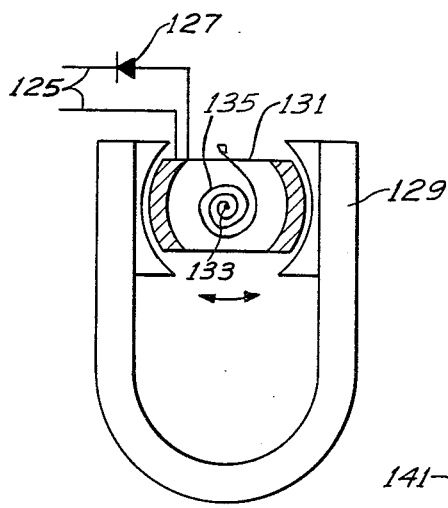
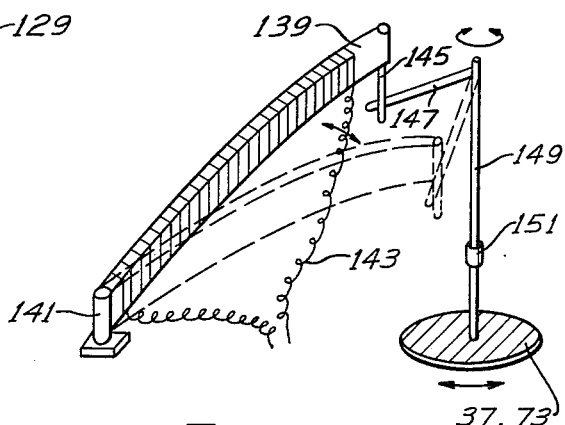
*Fig. 5.*    *Fig. 6.*
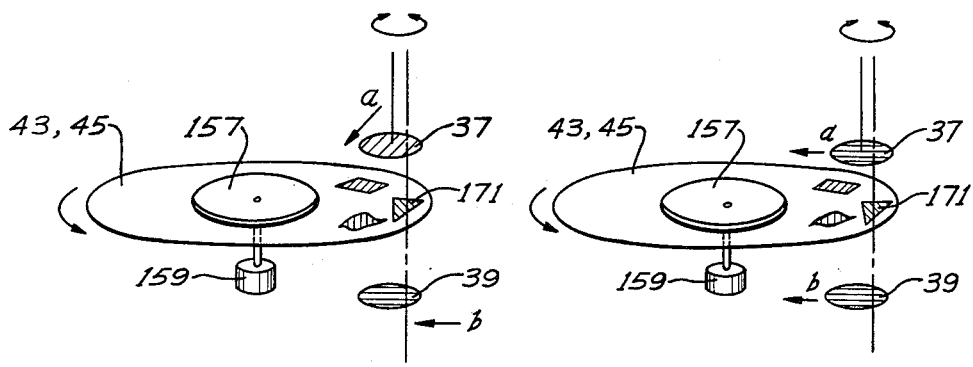
*Fig. 7.*    *Fig. 8.*
INVENTOR.
STANLEY B. ELLIOTT
BY
Meyer, Baldwin, Doran & Egan
ATTORNEYS.

3,163,078
APPARATUS FOR VISUAL INTERPRETATIONS OF ELECTRICAL CURRENTS
Stanley B. Elliott, 7125 Conelly Blvd., Walton Hills, Bedford, Ohio
Filed Oct. 3, 1963, Ser. No. 313,502
19 Claims. (Cl. 84—464)

This invention relates to visual interpretation of electrical current signals and more particularly to visual interpretation apparatus incorporating light polarizing means responsive to the characteristics of electrical current signals applied thereto and to interpret said characteristics and provide visual light patterns corresponding to said signals.

This is a continuation-in-part application of my co-pending application entitled "Apparatus For Visual Interpretations Of Electrical Currents," Serial No. 246,942, filed on December 26, 1962, now abandoned.

More specifically, the visual interpretation apparatus of the present invention is herein disclosed merely for purposes of illustration as being especially adapted to interpret electrical current signals that fall within the frequency range generally referred to as the "audio frequency" range of electrical signals such as the signals provided by musical instruments, high fidelity systems and like audio signal generating devices.

However, as will later appear the visual interpretation concepts of the present invention may be readily adapted in interpreting apparatus for electrical current signals of other frequency ranges and/or characteristics.

Heretofore, many attempts have been made to provide visual interpretation systems for electrical current signals in an effort to synchronize the light patterns resulting from said signals and the audio sounds thereof so as to obtain a satisfying composite audio and visual light effect.

Color organs, for example as oftentimes referred to in the art, are such systems that have been in use prior to my invention and whose limitations have been characterized by the very limited number of visual effects or designs, especially as to shape and form, that are possible to obtain from said system. Oftentimes the light patterns produced by said organs are of such random nature that the eye cannot easily correlate them with the audio sounds concurrently representing said patterns, resulting thereby in quickly fatiguing the eye. Likewise, if music of various types is played sequentially it is especially apparent that the designs displayed thereby are all of the same general style or character. Further, if attempts are made to change the visual design characteristic of the system, it is a tedious and expensive process.

Accordingly, one of the objects of the present invention is to provide apparatus for visual interpretation of electric current signals in which the visual components thereof include polarizing light means which are instantaneously responsive to the characteristics of said signals to provide visual light patterns corresponding to said signals.

Still another object of the present invention is to provide apparatus for visual interpretation of electric current signals in the audio frequency range.

Another object of the present invention is to provide apparatus for visual interpretation of audio current signals and wherein the visual components of said apparatus may readily be modified to best suit the mood and type of audio signals to be interpreted.

Another object is to provide apparatus in which inexpensive and mass produced birefringent design elements may produce exceptionally handsome visual displays that are synchronized with the audio current signals.

Another object is to provide visual interpretation apparatus which is operable to modulate the brightness of the background lighting particularly in the area around the visual designs, to properly match the mood created by the volume level of the audio signal such as for example in interpreting music, wherein a dark background represents soft music and a bright background represents loud music.

Another object is to provide visual interpretation apparatus which takes advantage of the inherently pleasing interference colors formed by interposing birefringent materials between polarizing elements, with a resultant automatic formation of complementary colors, to form exceptionally complex and thus stimulating colored designs synchronized in motion and mood with audio sound.

Another object is to provide visual interpretation apparatus which is operable in response to a variation or change in the signal characteristics of a frequency modulated audio system to provide visual light patterns corresponding to said signals.

Still another object is to provide visual interpretation apparatus which is operable in response to a variation or change in the signal characteristics of an amplitude modulated audio system to provide visual light patterns corresponding to said signals.

Additional objects and advantages of the visual interpretation apparatus of the present invention will be apparent to one skilled in the art to which it pertains and upon reference to the following disclosure of several preferred embodiments thereof, and which are illustrated in the accompanying drawings in which:

FIG. 1 is a view shown partially in schematic form of a transmission type system for providing visual interpretation of electric current signals in accordance with the present invention;

FIG. 2 is a view showing a second embodiment of an optical system for use in the visual interpretating apparatus of the present invention and is herein identified as a reflection type system wherein the polarized light beam passes successively through a polarized element and birefringent material, is reflected, and then passes back through the birefringent material and the original polarizing element which now serves as an analyzer;

FIG. 5 is a view of one form of polarizing element actuator which is sensitive to the amplitude to the electric current signals;

FIG. 6 is a perspective view of another form of actuator;

FIG. 7 is a perspective view of light polarizing means incorporated for use in the apparatus of the present invention and which includes birefringent design elements interposed between polarizing elements whose planes of polarization are at right angles to each other;

FIG. 8 is a view similar to FIG. 7 but with the plane of polarization of the polarizing elements parallel to each other.

Figure 2:
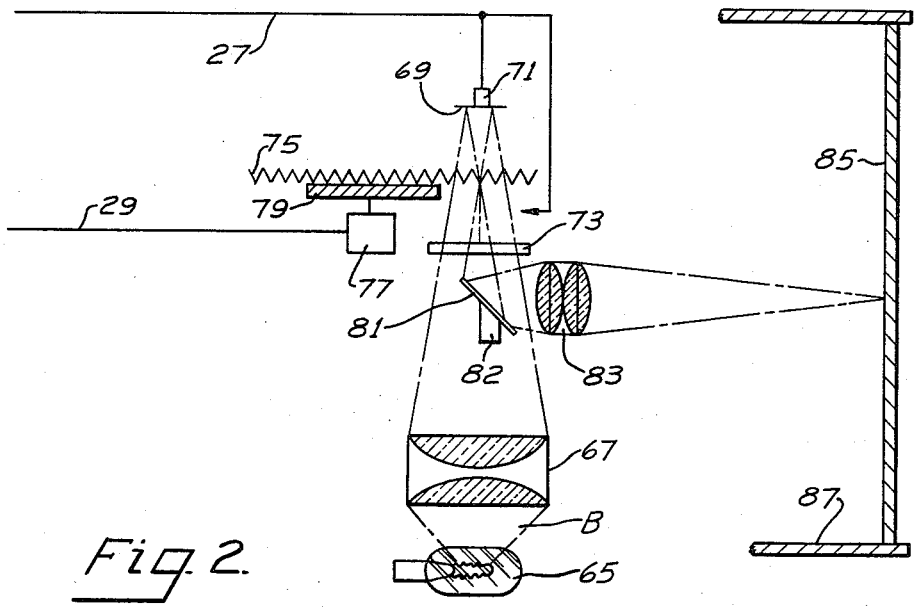

Briefly, the visual interpretation apparatus of the present invention incorporates a light polarizing optical system with means producing electrical signal currents representative of an electrically generated phenomenon as for example audio sound or the like, wherein the optical system is actuatable by and responsive to said signal currents so as to instantaneously provide a visual interpretation of the characteristics of said signal currents.

In a representative embodiment of the visual interpretation apparatus of the present invention shown in FIG. 1, audio signals from such conventional sources as a phonograph 1, a radio tuner 3, a microphone 5, or any other like device 7 for generating audio frequency electric signal currents are fed to an amplifier 9 whereby said signals are amplified so as to be capable of operating speakers as at 11 and 13.

The amplified audio signal comprising as it does signal currents of a plurality of frequencies, the instant interpretation apparatus is provided with means for separating said signal currents into distinct signal bands. In the instant embodiment a high band pass filter 15 and low band pass filter 17 indicate ways in which said signal may be separated into two signal frequency bands, however as will later appear any desirable number of filters or the like capable of passing either distinct frequency bands or signals of single frequency may be used. These separated signal currents, properly amplified, are then utilized to operate various parts of the visual interpretation apparatus, the frequency range and the apparatus thus actuated being, as will appear, matched on an aesthetic basis. In the embodiment shown, the band of signal currents containing information above a frequency of approximately 250 c.p.s. is passed by the high pass filter 15 and is intended to actuate a polarizing element analyzer 37 and mirror 36 of the optical system. In like manner, the signal information below approximately 250 c.p.s. is passed by low pass filter 17, and controls the actuation of motor 47 which controls the positioning of a birefringent element 43 of said optical system.

As shown in FIG. 1, the optical system includes a light source 31 which projects a light beam onto a condenser lens 33 to provide a focusable beam A onto the aforesaid mirror 36. The polarizer element 37 is positioned in the reflected beam B from said mirror and the birefringent element 43 is located adjacent the side of said element 37 opposite said mirror as to receive the polarized light passing therethrough. A second birefringent element 45 is positioned adjacent the first birefringent element 43 being thus in position to receive the light passed by the latter.

The signal output of filters 15 and 17 are fed to suitable variable volume control elements 19 and 21, respectively, which may be of the conventional potentiometer type, and which function to provide a plurality of ratios of magnitudes of signal outputs, the reason for which will be later apparent. The adjusted signal outputs from said filters are then fed to suitable audio frequency amplifiers 23 and 25.

The amplified output signal current from amplifier 23 is carried by line 27 to amplitude sensitive electromechanical devices 35 and 41 connected in parallel and which may be of the selysn type of device. In device 35, a motion is imparted to flexible metallized plastic mirror 36 such as is disclosed in FIG. 3, corresponding to the magnitude of the aforesaid output signal so as to change its arc of curvature and thus its focal point with respect to light beam B. As its focal point changes, the size of the brilliantly illuminated spot projected on birefringent design materials 43 and 45 changes. Preferably the electromechanical device 15 is adjusted so the size of the luminous spot increases as the amplitude of the signal current from amplifier 23 increases.

In electromechanical device 41, a rotary motion is imparted to its shaft 40 in proportion to the signal amplitude which, in turn, rotates polarizing element 37 connected thereto as to vary the angular relation of its axis with respect to the axis of polarizing element 39 which intercepts the reflected light beam B from mirror 36.

As is understood in the art, the source of signal currents may also be a conventional frequency modulated type of receiver or the like. In this instance, lines 27 and 29 may be connected to the detector stage of the receiver and the electromechanical devices 35 and 41 may be of the type that are proportionately responsive to the frequency deviation of said signal currents in said detector stage.

The light beam, after being polarized by polarizing element 37, is focused on birefringent design material 43 and/or 45, between them, or close thereto, the positioning of said beam being determined as aforementioned by the actuation of adjustable mirror 36. Birefringent design materials 43 and 45, may take the form of flat discs, and are characterized by their birefringent or doubly refracting nature. The entire disc may be birefringent or, more desirably, abstract or representational designs rendered in birefringent materials are fixed in or on a non-birefringent transparent material. As is understood, the color produced by a particular bit or birefringent substance interposed between polarizing elements depends on its angular relation to them. Ordinarily the principal optical direction of such birefringent substances comprising the design, whether sheet polymers such as Mylar or Cellophane or crystals such as thiourea or diethylthiourea, are directed randomly so that many portions of the total design at any moment are oriented so as to create color effects and few are so oriented in relation to the polarizing elements to be of neutral tint. Obviously, it is desirable that most of the design element is formed in highly transparent birefringent materials though translucency may introduce variety. And even some opaque, non-birefringent materials may be used for the contrast of their profiles against the brilliantly glowing birefringent materials. Another applicable technique is to perforate designs in birefringent materials. Embossed and stressed birefringent materials may also be used for fine effects.

Birefringent material as aforesaid, is characterized by its doubly refracting nature. That is to say, when a light beam enters the birefringent material, it is divided into two components, one defined as an extraordinary ray and the other an ordinary ray, each vibrating in a direction substantially at right angles to the other and traversing the birefringent material with a different index of refraction and velocity to thereby introduce a phase difference therebetween. As said beam is thereby resolved into two components, one of which is retarded with respect to the other, said beam is generally referred to as being elliptically polarized.

As is well known, when birefringent material such as components carried on discs 43 and 45 are used in combination with light polarizer elements such as identified herein as polarizer 37, and analyzer element 39, later to be described, the light rays emanating therefrom are adapted to interfere, which interference may be resolved into transmitted light of one or more interference colors depending upon the phase relation between said light rays or extinction of one or all of said colors depending primarily upon whether said interference between said rays is of a reinforcing or destructive nature.

Birefringent disc 43 bearing birefringent designs rests on a turntable 51 rotated at a variable speed by motor 47. In the instant embodiment, motor 47 is intended to be a conventional D.C. motor driven directly by the signal output of amplifier 25 connected thereby by way of line 29. Thus its speed increases and decreases in response to and in proportion to the amplitude increase or decrease of the signal output from said amplifier 25. Motor 47 may also be of the type that is frequency responsive when using a frequency modulated source of signal currents. The turntable 51 and armature of motor 47 are preferably of low mass so that a minimum of signal is used in overcoming the inertia of said elements to thereby resolve in the acceleration and deceleration of said motor closely following the rise and fall of the magnitude of the amplified signal output.

Disc 45 bearing birefringent designs rests on a turntable 53 which may be rotated at a constant speed by a conventional A.C. motor shown diagrammatically at 49.

The disc 45 carrying birefringent designs is seen to be disposed below the disc 43 so as to intercept the light emanating therefrom, being thus operable to elliptically polarize said light and to thereby result in producing various interference colors and effects, as aforesaid.

The beam of light, having passed through the polarizer 37 and birefringent discs 43 and 45 bearing birefringent design elements, then passes through the "analyzer," polarizing element 39. This may be manually adjustable as to angle of interception. The effect of this "analyzer" is to create multicolor designs, the various hues and saturation depending, as aforementioned, on the retardance of the birefringent materials on discs 43 and 45 and the angular relation of the polarizing elements 37 and 39 with respect to each other and said materials.

As stated above, either or both the polarizer element 37 and analyzer element 39 may be rotated. In the case where one element is rotatable, the remaining element may preferably be angularly adjustable so that its "zero point" (minimum light transmission with zero signal) may be easily determined.

Likewise, in the event analyzer element 39 and polarizer element 37 are simultaneously rotated, it is preferred that they are not actuated in synchronism with each other inasmuch as this will minimize the visual polarizing effect resulting therefrom.

So the designs may be properly visually displayed, the instant optical system includes a projection lens 55, of proper focal length for rear projection viewing, screen projection, wall illumination or whatever method or projection is desired, and which lens is located adjacent the analyzer element 39 so as to intercept the light emanating therefrom. Lens 55 may be a single lens, duplet or otherwise; color corrected or having any suitable characteristics for the quality of light rendition desired.

Though the position of discs 43 and 45 with respect to viewing screen 59 is shown in a particular spatial relationship, they can be located in various positions so as to cause the designs projected on the screen to appear to move thereacross in different directions. Further, either disc's direction of rotation may be independent of the other and may be fixed or reversible with respect thereto.

Though not essential in some optical systems, the instant embodiment uses a projection mirror 57 to project the resultant light onto a screen 59. Instead of using a planar mirror, a more comprehensive visual display may be created by having a partly planar mirror reflecting surface, for example one that changes from convex or concave, to concave or convex, respectively. Thus, the projected light patterns or images, as an example, may appear to materialize from the bottom of the screen, may move into sharp focus for clear viewing in the mid section of the screen and distortedly funnel into a converging section at the top of the screen. This gives the eye an area to focus on and eliminates the routine appearance of a sharp image on one side of the screen and its disappearance on the opposite side.

The screen 59, as will be realized may be of many types, though as illustrated it is shown as a translucent rear projection screen set in housing 61.

The flexible mirror is ordinarily placed at right angles to the plane of the birefrigent design discs and closely adjacent to them.

Importantly, at the lowest magnification of the condenser lens system the imaged light source occupies only a limited portion of the viewing screen. As the amplitude of the signal output from amplifier 23 increases and the system increases its magnification the imaged light source fills or approaches filling the entire screen area.

Focusing facilities are likewise desirable for the projection lens since entirely different effects are secured if one birefringent design disc is in focus and the other out of focus as compared to the opposite, or if focus lies between the discs.

As was noted above, polarizer 37 rotates an amount that is directly dependent on the amplitude of the signal output from amplifier 23. If the "at rest" or "zero signal" position of polarizing element 37 in relation to analyzer element 39 is such that the respective planes of polarization thereof are at right angles to one another, little or no light will pass through, unless birefringent designs on discs 43, 45 intercept the polarized beam from 37. If the latter case applies, the designs will pass light in the shape of the intercepting design carried on said discs though the space around the design, the "background," will remain blue-black or essentially zero light transmission. If a signal of sufficient amplitude is received by electromechanical actuator 41, reflecting the amplitude of output signal from amplifier 23, which is effective to rotate polarizer 37 90° to a position in which the planes of polarization of polarizer 37 and analyzer 39 are parallel, a maximum amount of light is passed thereby to the screen 59. The birefringent designs mentioned above will then have changed during said 90° rotation of polarizer 37 to their complementary colors and will appear against a bright, neutral-colored "background." Since any one birefringent design may contain many birefringent units having various orientations, it is apparent that various colors are thus capable of appearing and disappearing throughout the entire angular traverse of said polarizer 37 from its "at rest" position to its "maximum rotational" or parallel position with respect to analyzer 39.

The polarizer and analyzer may be parallel to one another and to the plane of the doubly refracting material. However, they may be permanently or adjustably angularly displaced with regard to the plane of the birefringent material so the polarized light may have to traverse varying thicknesses of birefringent material with a change in the resulting color.

With a particular crystal of birefringent material, as an example, the color observed when viewing the crystal when interposed between polarizing elements is a function of the angular relation of what is usually called the "polarizer" and the "analyzer." Thus, as the angular position varies from that in which the two planes of polarization are parallel to that in which they are at right angles, there is a change from one color to its complement, though there is a point where the material appears essentially colorless. The color produced by a particular birefringent material is a function of its thickness and how strongly birefringent the material is. Thus, in a design composed of individual elements of birefringent materials having varying thicknesses, varying strength of birefringence and varying direction of placement of the principal optical direction of the material, it is apparent that the design is composed of many colors. Further, and importantly, and unlike ordinary colored or dyed materials, as the angular relation of the polarizing element shifts there is continuous shift of color until at a 90° shift the complements are present. And in a complex birefringent design composed of many materials at many angles, no important part of the whole is passing through the colorless intermediate, and visually drab, phase at any one moment. Thus, designs are always visually exciting when properly composed as indicated.

Various sizes of polarizing elements may also be used depending where in the optical system they are situated. The key requirement is that they be located so as to intercept the beam projected from the light source, so no unpolarized light reaches the screen.

Another possible variation is to use a "Vectograph" as a polarizing element. A "Vectograph" consists of polarizing material similar, for example, to Polaroid Corporation's "H" sheet which is an iodine stained polymeric material.

element 73, which now serves as an analyzer for the polarized beam as will be understood.

The element 73 is rotated by any suitable amplitude responsive electromechanical device in the same manner that element 37 of FIG. 1 is rotated by actuator 41. In this instance, since the light beam must pass around the electromechanical device, it is preferable that an arm type of rotator be used, such as is shown in FIG. 6 hereinafter described, rather than installing the said assembly in the path of the light which may diminish the beam emanating therefrom.

It will be noted only one birefringent design disc, 75, is used here, being carried on turntable 79 the latter being driven by a variable speed motor 77 which is responsive to amplitude variations in the output signal from amplifier 25. Although, this simpler system provides a more repetitive light pattern display than when two or more moving birefringent design discs are used as in the previous embodiment, it is quite suitable for many applications.

The colored design image passing through analyzer 73 strikes and is then reflected from mirror 81, which suitably may be plano-concave as in mirror 57 of the previous embodiment and is preferably kept as small as possible since it is located on the optic axis. Projection lens such as lens duplet 83, of appropriate focal length, may then be utilized to project the image for viewing onto a suitable screen 85 set in housing 87.

Mirror 81 may be manually adjustable being carried on pedestal 82 so as to change the size of the illuminated spot on screen 85.

In this system the color changes are not so dramatic as the polarizing element rotates, nor does the "field," or the area around the birefrigent design elements, vary from blue-black low transmission, to a bright neutral color-high transmission. However, for displays where low cost and compactness of apparatus are desirable, the "reflection" technique may be preferable in its use.

Figure 4:
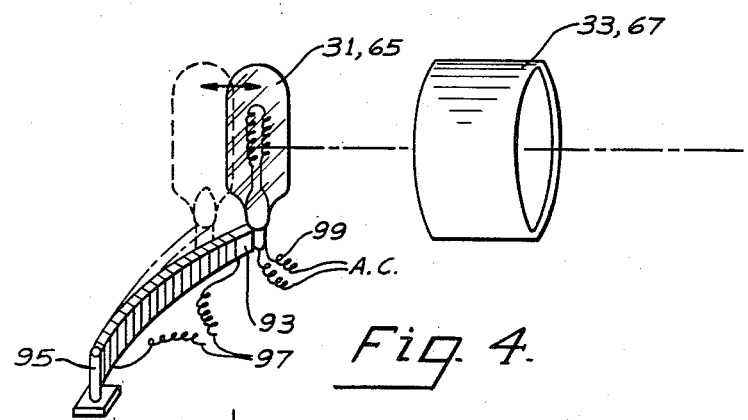
FIG. 4 shows another mode of changing the focus.
Figure 3:
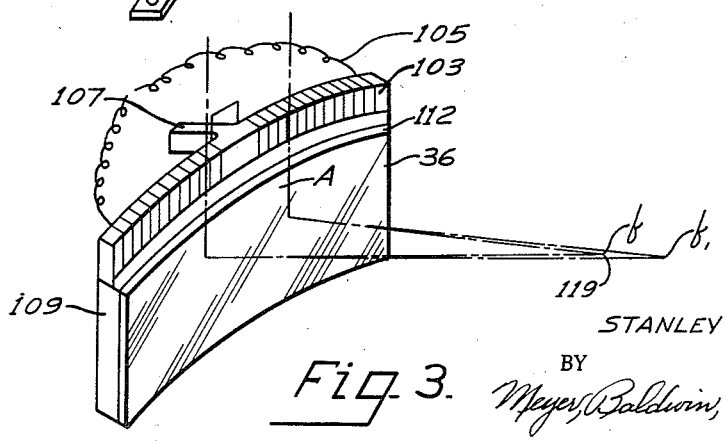
FIG. 3 is a perspective view of one mode of changing the focus of the image generated by the optical system.

FIGS. 3 and 4 show two types of electromechanical actuators by which the focal point of the light condensing lens unit of the optical system may be changed. FIG. 3 is the type adapted for use in the apparatus of FIG. 1, in which the flexible metallized plastic mirror 36, usually at 90° to the axis of the light beam A from condensing lens 33, by a change in its arc of curvature changes its focal point f. Since the birefringent design material on which the beam A is focused is fixed in position, the effect of changing the focal point thereof is to change the size of the brilliantly illuminated spot projected thereby onto the birefringent materials carried on discs 43, 45. The effect, as seen on the viewing screen, is to change the area of potential brilliance in proportion to the amplitude of the sound wave audio frequency signal current from amplifier 23.

In detail, the flexible reflector mirror 36 is fastened to supporting arms 109 and 112. Passage of the electric current from amplifier 23 into resistance wire 105 wound around bimetallic strip 103 and insulated therefrom heats said strip and causes it to bend in the direction of the laminating element having the lowest coefficient of expansion. The whole assembly then, supported from arm 107, changes in proportion from its base curvature (whether plane, concave or convex) to a corresponding greater or less degree of curvature. In the embodiment shown, the reflector surface passes from concave, a position in which the bimetallic element is initially mechanically formed, and in which the light beam A is sharply focused at point 119, to a planar surface as the bimetallic strip is heated. Thus, the focal point f will be extended to say f' or in other words the brightly illuminated area projected onto the birefringent materials 43, 45 increases in size.

In FIG. 4 the focal point of the condensing system is shifted by changing the position of the projection bulb 31, 65 in relation to the condensing lens 33, 67, respectively. A bimetallic strip 93 mounted on a fixed pivotal point such as post 95 is electrically insulated from but heated by resistance wire 97 which is connected by wire 27 to the output signal current from audio amplifier 23. Thus, projection bulb 31, 65 heated by standard A.C. power connected to said source by flexible lines 99 moves back and forth as the bimetallic strip heats and cools. Thus, the focus of the condensing lens 33, 67 is adjusted in synchronization with and corresponding to the change in amplitude of the sound wave audio frequency output from amplifier 23.

FIGS. 5 and 6 show two types of electromechanical actuators by which the angular relationship of polarizing elements and birefrigent design elements of the embodiments of apparatus of FIGS. 1 and 2 may be changed in response to amplitude variations in the signal output of the audio frequency amplifiers 23 and 25. The embodiment of device shown in FIG. 5 is an arrangement commonly used in voltmeters wherein the input current, entering and leaving through flexible lines 125, is rectified by diode 127 and passes to movable coil 131, rotating on shaft 133 in the magnetic field from permanent magnet 129. Spring 135 restores the coil 131 to its rest position when no current passes therethrough. The polarizer disc is fastened to one end of the shaft 133 so that its plane of polarization is rotated in proportion to the change in amplitude of the incoming signal from amplifiers 23, 25. As will be understood, it may be desirable to provide some type of viscous fluid damping so as to make the moving coil 131 relatively insensitive to minor transient signal currents if there is not sufficient damping due to the mass of the moving coil, polarizing disc, etc.

FIG. 6 shows a system in which bimetallic strip 139 is electrically insulated from resistance wire 143, wound thereon. The resistance wire 143 is connected to amplifier 23 so as to be responsive to the output signal currents therefor and as the wire is heated and/or cooled, strip 139 bends in proportion so as to correspondingly rotate the polarizer 37, 73 in relation to the change in signal amplitude. The strip 139 is preferably fastened at one end to a fixed point such as post 141 and carries arm 145 on its opposite end so as to be movable in the same arcuate plane. Arm 145, fastened to link 147, the latter being fastened to shaft 149, operating in bearing 151 and maintaining polarizing disc 37, 73 at its opposite end, then moves in proportion to the energization of the strip 139 thus causing the polarizing disc to rotate in a corresponding manner.

FIG. 7 shows one form of birefringent design disc adapted for use with the apparatus shown in FIG. 1 and which is placed on a turntable 157 the latter being rotatably driveable at varying speeds by D.C. motor 159. Said design disc is seen to include a triangularly shaped piece of birefringent material 171 which is positioned to intercept some of the light passing through polarizing element 37 and which then passes to polarizing element 39. Though polarizing element 37 as aforesaid may be rotated by actuator 41 and in response to amplitude changes in the signal output from amplifier 23, it is shown herein in its "rest" position. The planes of polarization as indicated at a and b, respectively, are at right angles to each other so little or no light passes therethrough. The exception, of course, is in the area on the viewing screen which represents the light passed by the birefringent triangle 171 as will be understood.

FIG. 8 shows the polarizing element 37 rotated 90° as caused by a large amplitude audio frequency signal from amplifier 23 whereby its polarization plane a is parallel to the polarization plane b of polarizing element 39. In this position maximum light is passed by said polarizers, the birefringent material of triangle 171, as aforementioned generating an interference light beam to thereby cause the transmitted beam to the viewing screen 59 to have one or more interference colors depending upon the plane relationship between said polarizers and birefringent material.

The polarizer and analyzer and birefringent materials may be positioned in other ways than those just mentioned in order to develop satisfactory displays. Thus, birefringent materials may be used to partially or totally cover the lower face of the rotating polarizing element of FIG. 1 so as to rotate with the polarizer and thus create varying interference colors due to the net retardation response of this birefringent material together with that of the two birefringent design discs of FIG. 1.

As a variant of this, a manually adjustable sheet of birefringent material may be interposed on the optic axis suitably between the polarizing and analyzing polarizers. This may be a single sheet, a laminate of two or more sheets with their principal optic directions not parallel, or other similar variants. Though the interposed material is not responsive to any signal, a varying retardation response occurs as the polarizer rotates and this interacts with the retardation responses developed by the two moving birefringent elements.

Figure 9:
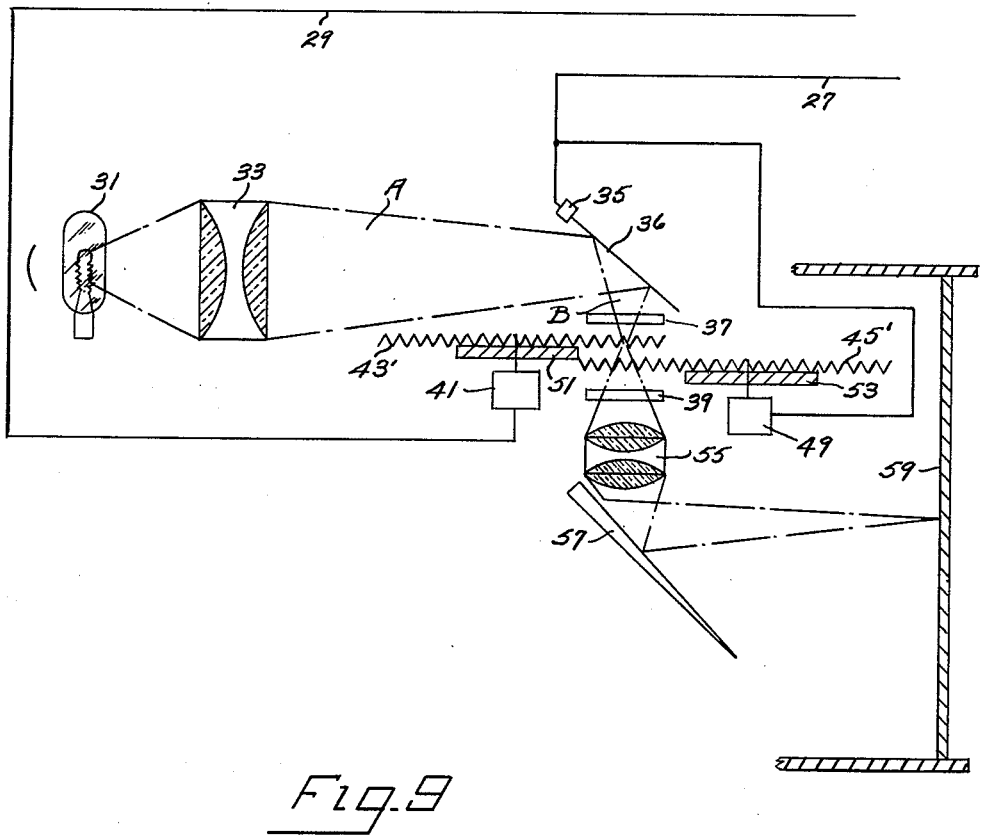
FIG. 9 is a diagrammatic view of still another embodiment of system incorporating the present invention.

As a still further variation, FIG. 9 illustrates another mode of developing a varying retardation response. Here, instead of rotating the polarizer and leaving a birefringent element fixed, the polarizer 37 and the analyzer are fixed in position and one of the birefrigent elements 43' is rotated so as to vary the angular relation of the principal optical direction of said element with respect to the axes of polarizing elements 37 and 39. The desired rotary motion is imparted to the birefringent element 43' by electromechanical device 41, the rotary motion being proportional to the signal amplitude or frequency deviations. As noted before, devices such as are illustrated in FIGS. 5 and 6 are typical of suitable electromechanical agents.

Polarizer 37 and/or analyzer 39, though not responsive, may be manually adjusted to various angular relationships to each other. Birefringent element 43', whose rotation is proportional to the signal, most desirably undergoes an excursion from minimum retardation response to maximum or vice versa. Two or more layers of birefringent materials may be laminated with their principal optical directions not parallel. In such a case the effect is complex but again it is usually most desirable esthetically to drive the element between two different positions representing two different colors.

Birefringent element 45' is disposed so as to intercept the light emergent from birefringent element 43', and in this case birefringent materials are most suitably disposed at various angles in a suitable design. The element 45' rests on turntable 53 rotated by variable speed motor 49. In the instant embodiment, motor 49 is intended to be a conventional D.C. motor driven directly by the signal output of amplifier 23 connected thereby by way of line 27. Thus, its speed increases and decreases in response to and in proportion to the frequency deviation or amplitude increase or decrease of the signal output from said amplifier 23.

As would be expected, a reflection type of device similar to FIG. 2 is possible by simply fixing the combination polarizer-analyzer and rotating the birefringent element by any suitable amplitude responsive electromechanical device in the same manner that the angularly rotatable birefringent element of FIG. 9 is rotated by its actuator 41.

From the foregoing it is clear that rich interference colors may be formed in various ways. Even the effects produced when neither the polarizer and analyzer nor a birefringent element are moved proportionally and angularly but rather when only birefringent design elements are moved at variable speeds proportional to the control signal are visually attractive. This is true, of course, because at least one of the birefringent design elements lies essentially in the focal plane of the projection system unlike ordinary masks and filters.

For additional interest other variations in the retardation response are introduced. Thus, fixed birefringent means may be interposed between the polarizing polarizer and analyzer, one of which is proportionately and angularly responsive to the control signal. Or, again, the polarizing and analyzer means may be fixed while one of the birefringent means is proportionately and angularly responsive to the control signal.

Thus, for developing the varying retardation response, election of a particular means will depend on the colors sought, the color shifts desired, mechanical considerations such as the stiffness factor of elements which must be rapidly responsive to varying signals, and similar matters.

Having thus described in detail several preferred embodiments of visual interpretation apparatus of the present invention, it will be realized that the same is susceptible to various changes, combinations and arrangements of components without departing from the inventive concepts thereof as are defined in the claims.

What is claimed is:

1. In apparatus for visually interpreting electric signal currents comprising a source of electric signal currents, means for deriving at least one control signal representative of said signal currents, a light source, a polarizer element in light intercepting position with respect to said light source effective to polarize light emanating therefrom, an analyzer element for receiving light from said polarizer element, means actuatable by and responsive to the magnitude of said control signal to proportionately vary the position of the polarizing axis of said polarizer element with respect to said light source and effect a consequent change in its polarizing response to said light source between its zero and maximum light emergence positions, birefringent means positioned to intercept the light emanting from said polarizer element effective to provide retardation thereof, said birefringent means being also actuatable by and responsive to the magnitude of said control signal to proportionately alter its position and effect a consequent change in its retardation response to said polarized light.

2. In apparatus for visually interpreting electric signal currents comprising a source of electric signal currents at a plurality of frequencies, means for deriving at least one control signal representative of said signal currents, a light source, a focusable optical system in light intercepting position with respect to said light source and including a pair of polarizer elements effective to polarize and analyze light from said source, at least one of said polarizer elements being responsive to at least one of said control signals so as to proportionately vary the position of its polarizing axis with respect to said light source and consequent polarizing response to said source, a pair of birefringent elements interposed between said polarizer elements and effective to provide interference light rays representing various hues and colors, at least one of said birefringent elements being responsive to at least one of said control signals so as to alter its position and consequent retardation response to said source, and means in light intercepting position with respect to the light emerging from said polarizer elements for projecting the resultant light patterns of said optical system onto a surface for viewing.

3. In apparatus for visually interpreting electric signal currents as is defined in claim 2, and wherein the optical system includes a light condenser system effective to adjustably regulate the size of the image projected onto said surface.

4. In apparatus for visually interpreting electric signal currents as is defined in claim 2, and wherein the light source is responsive to the control signals effective to change its position with respect to the polarizer and birefringent elements.

5. In apparatus for visually interpreting electric signal currents as is defined in claim 2, and wherein the optical system includes light reflecting means responsive to the control signals so as to vary the image projected onto said surface.

6. In apparatus for visually interpreting electric signal currents as is defined in claim 2 and wherein at least one of said birefringent elements is disposed at approximately the focal point of said projecting means.

7. In apparatus for visually interpreting electric signal currents comprising a source of signal currents having a plurality of frequencies and amplitudes, means for deriving control signals representative of said signal currents, a light source, a polarizer element in light intercepting position with respect to said light source effective to polarize light emanating therefrom; an analyzer element for receiving light from said polarizer element, said polarizer element and analyzer element comprising a polarizer pair, means actuatable by and responsive to at least one of said control signals to proportionately and in an oscillatory fashion swing said polarizer element between 0° and 90° with respect to said analyzer element and effect a consequent change in the transmission characteristics of said polarizer pair.

8. In apparatus for visually interpreting electric signal currents comprising a source of audio signal currents having a plurality of frequencies and amplitudes, means for deriving control signals representative of said audio signal currents, a light source, an optical system in light intercepting position with respect to said light source and including a pair of polarizer elements, means actuatable by and responsive to at least one of said control signals to proportionately and in an oscillatory fashion swing each of said polarizer elements so as to develop a differential displacement thereof between 0° and 90° with respect to each other and effect a consequent change in the transmission characteristics of said polarizer pair.

9. In apparatus for visually interpreting electric signal currents as is defined in claim 8 and wherein one of said polarizer elements is responsive at a higher rate of actuation than the other of said elements to at least one of said control signals to thereby provide a differential displacement between the polarizing axes of said elements.

10. In apparatus for visually interpreting electric signal currents comprising a source of signal currents having a plurality of frequencies and amplitudes, means for deriving control signals representative of said signal currents, a light source, a polarizer element in light intercepting position with respect to said light source effective to polarize light emanating therefrom, an analyzer element for receiving light from said polarizer element, said polarizer element and analyzer element comprising a polarizer pair, means actutable by and responsive to at least one of said control signals to proportionately, and in an oscillatory fashion, swing said analyzer element between 0° and 90° with respect to said polarizer element and effect a consequent change in the transmission characteristics of said polarizer pair.

11. In apparatus for visually interpreting electric signal currents comprising a source of audio signal currents having a plurality of frequencies and amplitudes, means for deriving control signals representative of said signal currents, a light source, a combination polarizer and analyzer element in light intercepting position with respect to said light source effective to polarize light emanating therefrom, means actuatable by and responsive to at least one of said control signals to proportionately, and in an oscillatory fashion, swing said polarizer and analyzer element between 0° and 90° with respect to said light source and effect a consequent change in its polarizing response to said light source, reflecting means positioned to intercept light from said polarizer and analyzer element and to reflect said light back through said element and means for projecting the reflected image emerging from said element onto a surface for viewing.

12. In apparatus for visually interpreting electric signal currents comprising a source of audio signal currents having a plurality of frequencies and amplitudes, means for deriving control signals representative of said audio signal currents, a light source, a polarizer element in light intercepting position with respect to said light source effective to polarize light from said source, birefringent means positioned to intercept light emanating from said polarizer element effective to provide retardation thereof, an analyzer element positioned to receive light emanating from said birefringent means, said polarizer element and analyzer element comprising a polarizer pair, means actuatable by and responsive to at least one of said control signals to proportionately and in an oscillatory fashion swing said polarizer element between 0° and 90° with respect to said analyzer element and effect a consequent change in the transmission characteristics of said polarizer pair, and means in light intercepting position with respect to the light emerging from said polarizer pair for projecting said polarized light onto a surface for viewing.

13. In apparatus for visually interpreting electric signal currents comprising a source of signal currents having a plurality of frequencies and amplitudes, means for deriving control signals representative of said audio signal currents, a light source, a polarizer element in light intercepting position with respect to said light source effective to polarize light emanating therefrom, birefringent means positioned to intercept the light emanating from said polarizer element effective to provide retardation thereof, an analyzer element positioned to receive light emanating from said birefringent means, means actuatable by and responsive to at least one of said control signals to proportionately, and in an oscillatory fashion, swing said birefringent means between 0° and 90° with respect to said polarizer element and effect a consequent change in its retardation response, and means in light intercepting position with respect to the light emerging from said analyzer element for projecting said polarized light onto a surface for viewing.

14. In apparatus for visually interpreting electric signal currents comprising a source of audio signal currents having a plurality of frequencies and amplitudes, means for deriving control signals representative of said audio signal currents, a light source, a polarizer element in light intercepting position with respect to said light source effective to polarize light emanating therefrom, birefringent means positioned to intercept the light emanating from said polarizer element effective to provide retardation thereof, an analyzer element positioned to receive light from said birefringent means, said polarizer element and analyzer element comprising a polarizer pair, means actuatable by and responsive to at least one of said control signals to proportionately and in an oscillatory fashion swing said analyzer element between 0° and 90° with respect to said polarizer element and effect a consequent change in the transmission characteristics of said polarizer pair, and means in light intercepting position with respect to the light emerging from said analyzer element for projecting said polarized light onto a surface for viewing.

15. In apparatus for visually interpreting electric signal currents as is defined in claim 14 and wherein the birefringent means is disposed at approximately the focal point of said projecting means.

16. In apparatus for visually interpreting electric signal currents as is defined in claim 12 and wherein the light source includes means for variably regulating the size of the light beam intercepted by the optical system.

17. In apparatus for visually interpreting electric signal currents as is defined in claim 12 and wherein the birefringent means is also actuatable by and responsive to at least one of said control signals to proportionately alter its position with respect to said light source.

18. In apparatus for visually interpreting electric signal currents as is defined in claim 14 and wherein the birefringent means is disposed at approximately the focal point of said projecting means.

19. In apparatus for visually interpreting electric signal currents as is defined in claim 14 and wherein the light source includes means for variably regulating the size of the light beam intercepted by the optical system.

References Cited by the Examiner

UNITED STATES PATENTS

| | | | |
|---|---|---|---|
| 1,977,997 | 10/34 | Patterson | 84—464 |
| 2,167,484 | 7/39 | Berry | 88—65 |
| 2,423,321 | 7/47 | Hurley | 88—65 |
| 2,535,781 | 12/50 | Burchell | 88—65 |
| 2,591,701 | 4/52 | Jaffe | 88—65 |
| 2,677,297 | 5/54 | Wetzel | 84—464 |
| 2,700,919 | 2/55 | Boone | 88—65 |
| 3,048,075 | 8/62 | Wright | 84—464 |
| 3,062,085 | 11/62 | Smith | 84—464 |
| 3,089,802 | 5/63 | Coffman et al. | 272—10 |
| 3,104,273 | 9/63 | Ballance | 88—65 |

LEO SMILOW, *Primary Examiner.*